United States Patent [19]
Sesselmann

[11] Patent Number: 6,021,604
[45] Date of Patent: Feb. 8, 2000

[54] DEVICE FOR DISPLACING TRANSLATIONALLY DISPLACEABLE COMPONENTS IN MOTOR VEHICLES

[75] Inventor: Helmut Sesselmann, Coburg, Germany

[73] Assignee: BroseFahrzeugteile GmbH & Co. KG, Germany

[21] Appl. No.: 08/981,211

[22] PCT Filed: Jun. 28, 1996

[86] PCT No.: PCT/DE96/01196

§ 371 Date: Mar. 30, 1998

§ 102(e) Date: Mar. 30, 1998

[87] PCT Pub. No.: WO97/01454

PCT Pub. Date: Jan. 16, 1997

[30] Foreign Application Priority Data

Jun. 28, 1995 [DE] Germany .......................... 195 25 020

[51] Int. Cl.[7] ................................................. E05F 15/08
[52] U.S. Cl. .................... 49/349; 49/358; 49/352
[58] Field of Search ........................ 49/374, 375, 348, 49/349, 352, 358

[56] References Cited

U.S. PATENT DOCUMENTS

| | | | |
|---|---|---|---|
| 2,844,405 | 7/1958 | Roethel | 49/375 |
| 4,389,818 | 6/1983 | Sakamoto | 49/349 |
| 5,038,519 | 8/1991 | Huebner | 49/375 |
| 5,502,926 | 4/1996 | Grace et al. | 49/375 |
| 5,546,704 | 8/1996 | Maruoka | 49/375 |

FOREIGN PATENT DOCUMENTS

| | | |
|---|---|---|
| 0208237 | 1/1987 | European Pat. Off. . |
| 3416103 | 11/1984 | Germany . |
| 3531549 | 3/1987 | Germany . |
| 3841781 | 6/1989 | Germany . |
| 4316651 | 11/1994 | Germany . |
| 4428262 | 1/1996 | Germany . |

*Primary Examiner*—Jerry Redman
*Attorney, Agent, or Firm*—Christie, Parker & Hale, LLP

[57] ABSTRACT

A drive device (2) for translatory displaceable component parts in motor vehicles, more particularly for window regulators or sliding roofs is connected by an axis (6) to a base part (1) which consists of a part of the translatory displaceable component part (1). The drive device is supported for swivel movement about the axial centre point and elastically relative the base part (1).

21 Claims, 5 Drawing Sheets

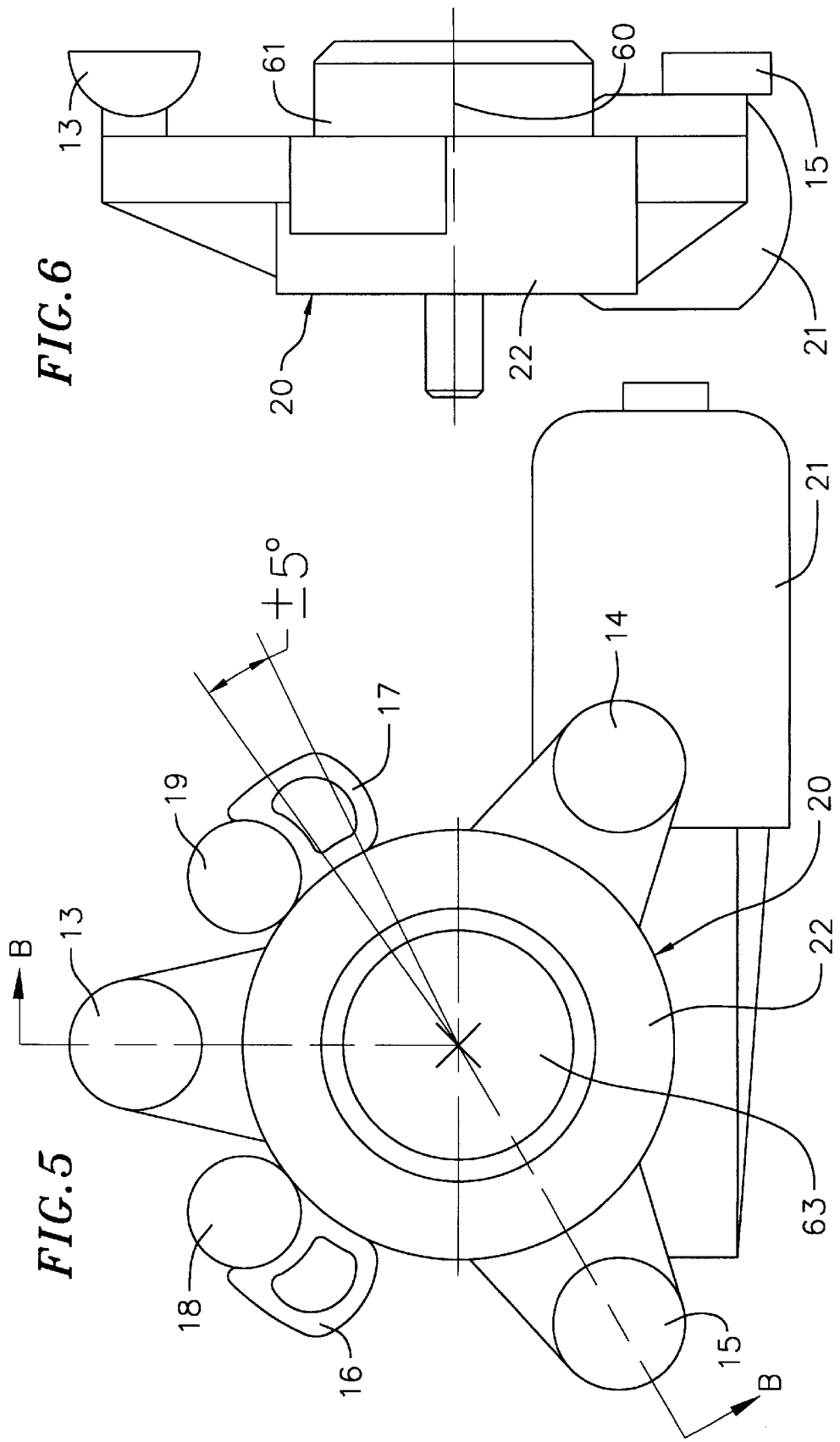

DEVICE FOR DISPLACING TRANSLATIONALLY DISPLACEABLE COMPONENTS IN MOTOR VEHICLES

FIELD OF THE INVENTION

The invention relates to a device for adjusting translatory displaceable component parts in motor vehicles, more particularly window regulators, sliding roofs and the like.

BACKGROUND OF THE INVENTION

A device of this kind is known from European Patent EP 0 208 237 B1. It consists of a combination of a window pane of a motor vehicle with a pane entrainment member, which connects the window pane to a guide device and is connected by a cable or guide pulleys to a locally fixed drive unit for the translatory adjustment of the window pane. The connection between the entrainment member and the window pane is provided by a through hole in the window pane and by a pin connected to the entrainment member and pushed through the hole. Support and secondary wings are provided on the entrainment member to guide the window pane and extend from the entrainment member to the surfaces of the window pane. The lower edge of the window pane rests on elastically deformable elements of the entrainment member in order to produce freedom of play and avoid rattling noises between the entrainment member and window pane.

Devices for adjusting translatory displaceable component parts in motor vehicles are normally screwed, riveted or partially welded with guide rails on base plates, inner door panels or body parts of a motor vehicle. Fixing the drive devices on the relevant base part thus requires a certain number of fixing elements predetermined by the static conditions and which have to be attached in several work steps and removed again should any repair become necessary. Apart from the additional individual parts the fixing of the drive devices on the base parts requires extra technological process steps which need assembly time and thus incur additional costs.

In order to reduce the load on parts of the drive device, such as the drive motor or the cable of a cable window regulator system, dampings are required during the switching processes, which become active upon reaching a stop and either absorb load peaks or dampen dynamic load peaks. This damping of the system has basically taken place inside the gearing of the drive device, such as in the form of keyed locking damping chambers in the worm wheel of the gearing of the drive device. Between the entrainment member and the worm wheel are radial damping rubbers which produce a deliberate energy conversion through rolling work in dependence on torque and thus absorb dynamic load peaks.

The damping elements mounted inside the gearing housing require an additional amount of gearing space and thus either reduce the effective guide length of the worm wheel and the entrainment member on the fixed axis, or lead to an increase in the outer dimensions of the gearing housing and the drive device. Moreover, when loaded, poor toothed engagement ratios and undesired axial expansion of the rubber damper result so that there is the threat of premature wear and the risk of a functional breakdown. Furthermore the degree of efficiency of the drive device is impaired.

SUMMARY OF THE INVENTION

The object of the present invention is to provide a drive device for translatory displaceable component parts in motor vehicles which allows simple assembly and dismantling of the device within a minimum time and also allows damping of the drive system without a negative effect on the gearing elements.

The solution according to the invention clearly shortens the assembly and dismantling process for the drive device and requires substantially fewer individual parts for fixing the drive device or for connecting it with the translatory displaceable component. Moving the damping of the drive system outside of the structural gear chamber provides a cost-effective damping and a flatter construction of the drive device. This flatter construction allows a more rigid ribbing of the worm wheel, and improves the guide length on the axis as well as an acoustic uncoupling of the drive device from the base part for taking up the translatory displaceable component or from the translatory displaceable component with an assembly-friendly arrangement of the relevant damping elements.

The solution according to the invention can be used both for stationary structural elements of the translatory displaceable component or a structural element for receiving the translatory displaceable component part and for movable structural elements of the translatory displaceable component part. In both cases there are advantages of a simplified and cost-reduced assembly and dismantling as well as optimum damping of the drive system while keeping a small structural size as well as maximum stability of the drive device and reducing the transfer of drive noises to body parts and/or the translatory displaceable component parts.

The base part can consist of a stationary or movable structural element of the translatory displaceable component part or device for receiving the translatory displaceable component part. In the event of a stationary structural element, the base part has several recesses or passages for receiving the axis as well as fixing elements of the drive device and damping elements. In the event of a movable structural element, the base part is displaceable through the drive device opposite the stationary structural elements of the component part or device for receiving the component part, has a bore for receiving the axis and is connected to the drive device through a damping device, or spring-elastic supporting points. The spring-elastic supporting points being fixing brackets with inserted rubber form elements.

The adjustment device known from European Patent EP 0 208 237 B1 has, unlike the object of the present invention, no drive device, but is connected to a force transfer element in the form of a cable so that only correspondingly aligned translatory forces come into effect. Since no torque load can occur, there is also no swivelling of the entrainment member about the axis through the hole in the window pane as a result of the reaction forces during rotational movement of the drive device in one or another direction. The connection serves only to connect the entrainment member to the window pane. The resilient bearing of the entrainment member, for holding the lower edge of the window pane, thereby serves solely to compensate the relative movements between the window pane and the entrainment member, in order to compensate in this way the tolerances between the entrainment member and window pane.

An advantage of the design according to the present invention is that the gearing housing of the drive device has an axially extending ring collar -and several mutually radially spaced fixing and damping elements arranged outside of the swivel axis of the ring collar and gearing housing.

As well as further facilitating assembly, a fixing and damping of the system is provided adapted to each requirement so that the drive device is uncoupled cost-effectively from the supporting structural element.

For an additional reinforcement of the system, the fixing means and the devices on the stationary structural element for receiving the fixing means are matched geometrically to each other.

The fixing elements can consist of cap or ball bolts which can be pushed through the recesses in the stationary structural element which are adapted to the diameter of the bolt heads. By turning the drive device, the fixing elements can be inserted into radially aligned recesses adapted to the diameter of the bolt pins, wherein the drive device can be secured against turning in the operating position by means of the damping elements.

With a direct connection of the drive device with the movable structural element of the translatory displaceable component part, the movable structural element preferably has a bore for receiving a fixing bolt which is connected or connectable with the drive device, and at least one, but preferably two, support points mounted on either side of the bore for receiving the damping elements.

This design according to the invention produces an advantageous integration of the movable structural element and the drive device which can be mounted with common protection. In the case of a window regulator integrated in a vehicle door, when the door is slammed or when lateral force components are brought into effect, the drive motor is prevented from turning about its transverse axis while at the same time the damping elements protect the window pane and the motor against damage. Additionally, in the case of two pretensioned damping elements, compensation is made for tolerances of the bore for receiving the fixing bolt connected or connectable to the drive device.

A further development of the design according to the invention is that the gearing of the drive device is constructed in two stages. Through the two stage design an extremely flat and narrow (minimum height) drive device is provided which can be mounted with particular advantage in narrow structural chambers.

A further advantageous design is that the output of the drive device is designed as a hollow shaft with keyed locking elements so that the drive device can be connected on both end sides with a pinion or a cable drum for driving the translatory displaceable component part and can thus be fitted universally. When used for a window regulator, it is no longer necessary to provide separate left and right designs.

BRIEF DESCRIPTION OF THE DRAWINGS

The idea underlying the invention will now be explained with reference to the embodiments shown in the drawings in which:

FIG. 5 is a plan view of a drive device with fixing and damping elements for connection with a stationary structural element;

FIG. 6 is a section along line B—B in the arrangement according to FIG. 5;

DETAILED DESCRIPTION OF THE INVENTION

Figure 1:
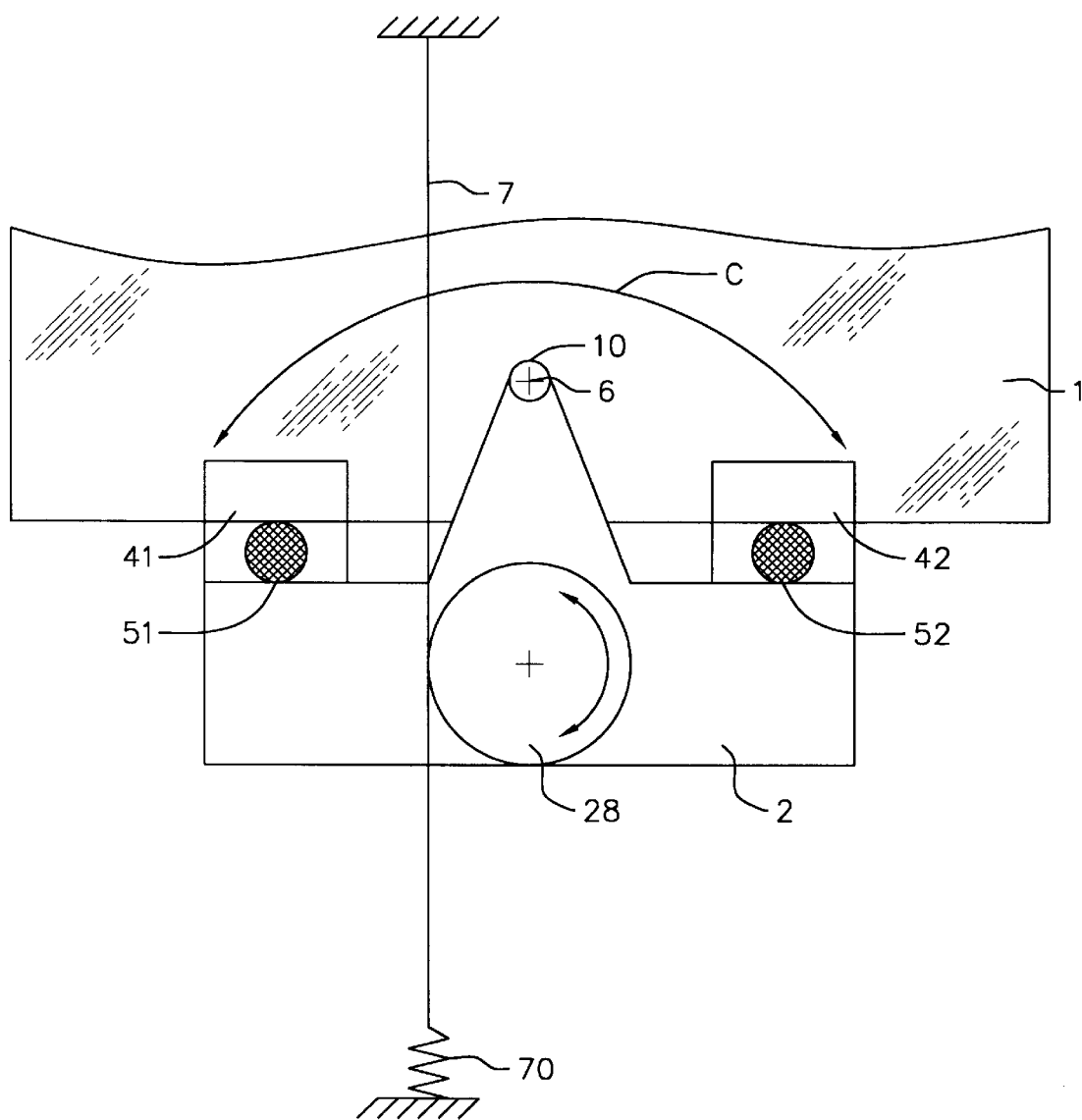
FIG. 1 is a diagrammatic illustration of a cable window regulator with drive device fixed on the window pane.

The diagrammatic illustration according to FIG. 1 shows a cable window regulator with a window pane 1 on which is fixed a drive device 2. The drive device 2 is part of an entrainment member preferably guided in a pane guide device and is connected to a cable 7 for translatory displacement of the unit comprising the window pane 1 and drive device 2. The cable 7 is fixed on an upper and lower cable mounting wherein a cable length compensator 70 is provided in the area of the lower cable mounting. The connection between the window pane 1 and drive device 2 is provided by a pane binding which consists of an axis 6 and a bore 10 provided in the window pane 1 for receiving the axis 6 (fixing bolt). The drive device 2 can swivel about this pane binding 6,10 in the direction of arrow C.

On each side of the pane binding 6,10 there are fixing brackets 41, 42 for stabilizing the sides and damping the arrangement when external forces act on the cable window regulator, in which rubber form elements 51,52 are inserted, and the lower edge 100 of the window pane 1 is inserted when the drive device 2 is fixed.

The connection of the drive device 2 with the cable 7 is provided by a cable drum 28 in a known way. As an alternative to the arrangement of a cable window regulator diagrammatically illustrated in FIG. 1, the principle of fixing the drive device 2 on the window pane 1 can also be used with a cross-arm window regulator or a window regulator with keyed force transfer elements which are fixed in the door body.

Figure 2:
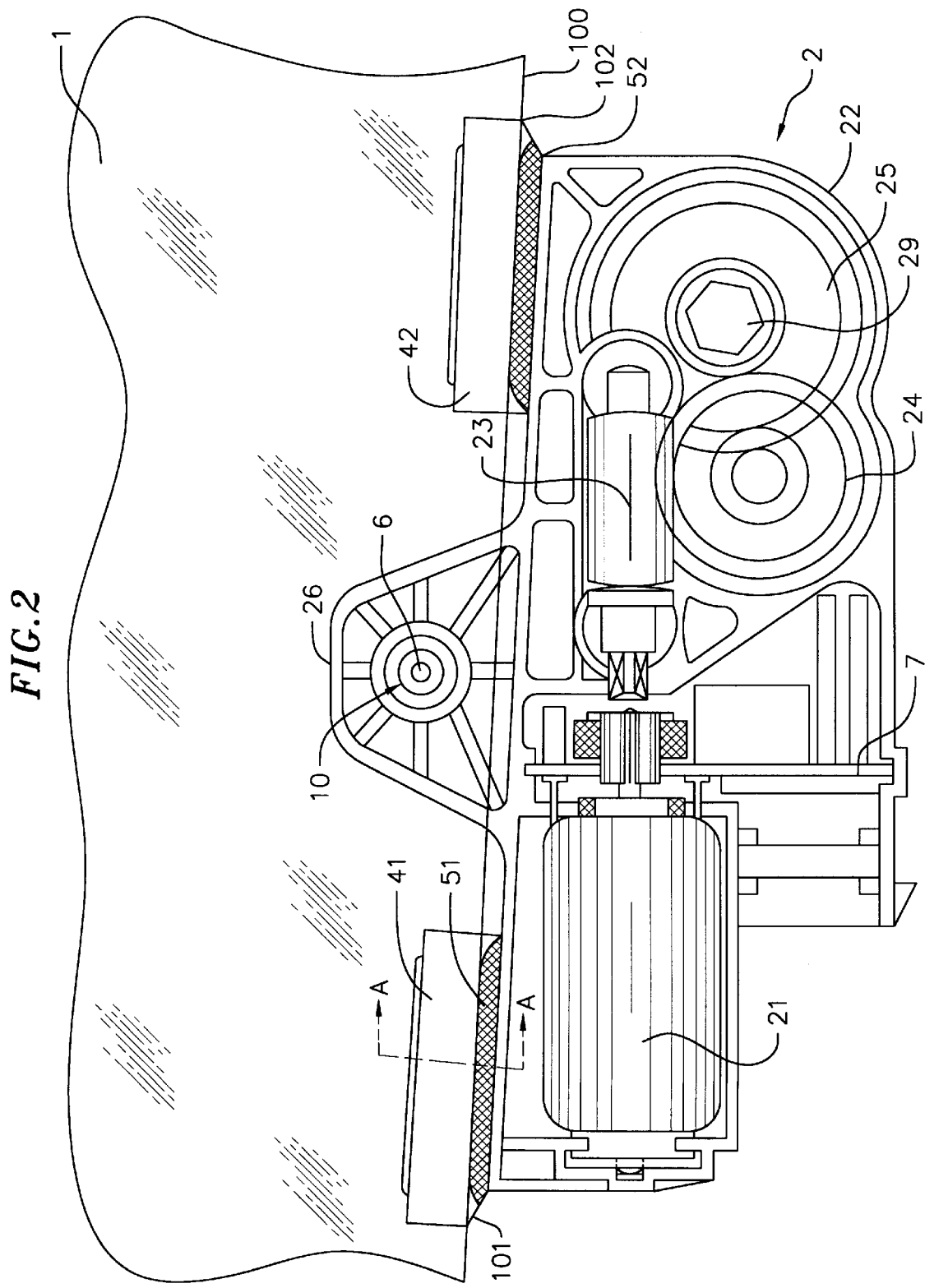
FIG. 2 is a detailed illustration of the drive device and its connection with a window pane corresponding to the diagrammatic illustration according to FIG. 1.
Figure 3:
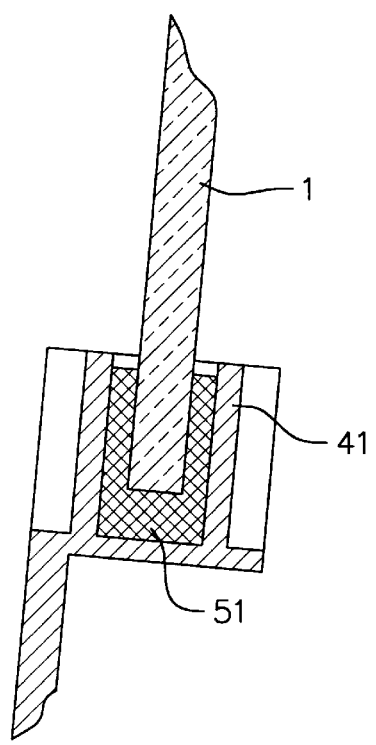
FIG. 3 is a sectional view through the damping device along the line A—A according to FIG. 2.
Figure 4:
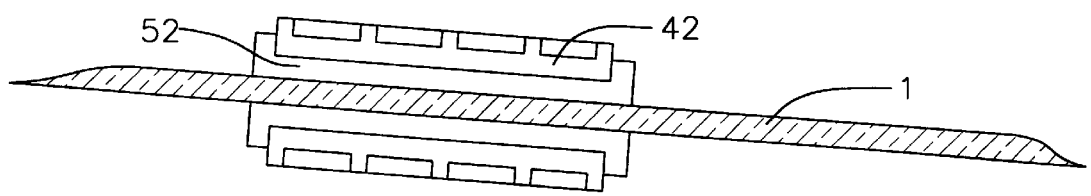
FIG. 4 is a view of the damping device in the direction of arrow X according to FIG. 2.
Figure 7:
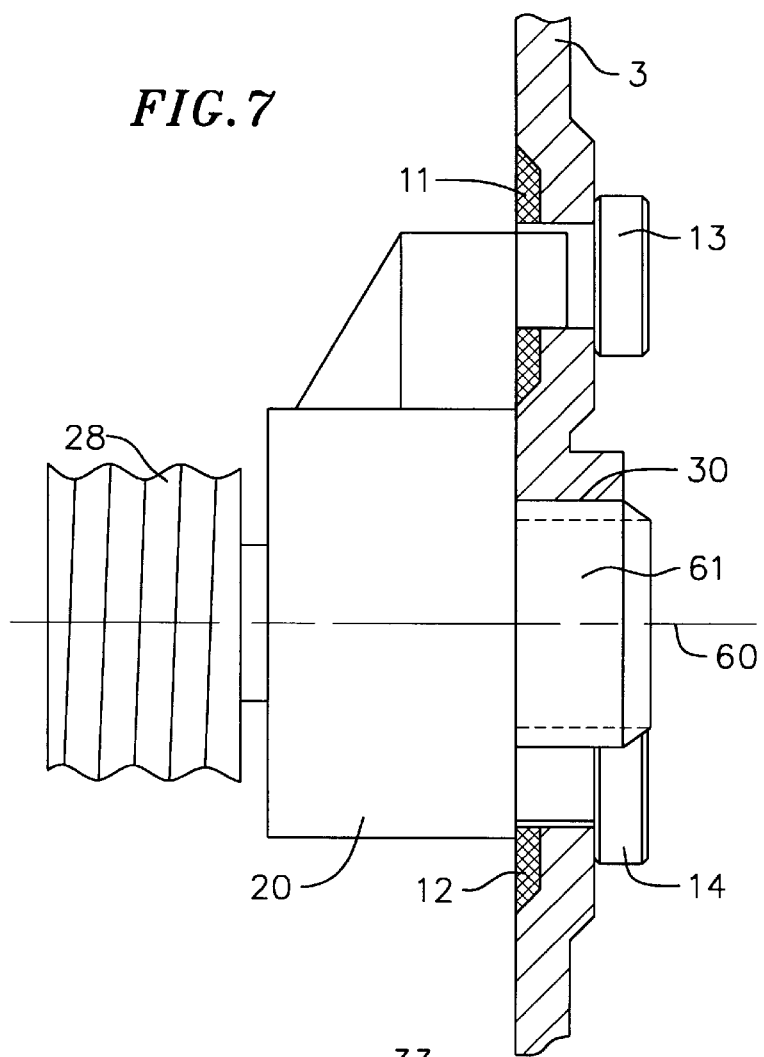
FIG. 7 is a longitudinal sectional view through an inner door panel or door module for receiving a drive device.

FIGS. 2–4 show in greater detail, the various features of the diagrammatic illustration according to FIG. 1.

The drive device 2 contains a drive motor 21 and a gearing 22 which has the drive worm 23 connected to the motor shaft, as well as two stepped gear wheels 24, 25 for a two-step gearing which consists of a worm wheel meshing with the drive worm 23 with pinion 24 and gearwheel 25. By means of a keyed locking element 29 an output element (pinion) can be clipped onto the axis of the gear wheel 25 which is connected with force and/or keyed engagement to the cable 7 or gear rod so that with clockwise or counter-clockwise running of the motor the drive device 2 is moved up or down together with the window pane 1. Since the output element can be clipped onto either side of the gearing, it is possible to use the device described both for a right hand and left hand arrangement.

The connection of the window pane 1 with the drive device 2 takes place through a fixing eye 26 located on the gearing housing and through which the drive device is fixed with keyed engagement in a bore 10 of the window pane 1. Fixing is through an axis 6 which is preferably designed as a plastic bolt so that the drive device 2 can turn slightly about the pane binding 6,10.

On either side of the pane binding 6,10 are damping devices which consist of fixing brackets 41, 42 with inserted rubber form elements 51, 52. The lower edge 100 of the pane is inserted in these fixing brackets 41, 42 so that the supporting points 101, 102 of the lower edge 100 of the pane rest on the rubber form elements 51, 52, which according to the geometry and Shore hardness of the rubber elements 51, 52 restrict the damped turning movement of the drive device 2 about the pane binding 6,10. Such movement of the drive device 2 about the pane binding 6,10 results from the fact that with clockwise or counter-clockwise running of the drive motor 22 of the gearing block through the cable forces about the pane binding 6,10, a torque is produced whereby the turning angle is dependent on the geometry and Shore hardness of the rubber form elements 51,52.

The window pane thereby always adjoins the flank of the rubber elements 51,52 so that when the door is slammed or when lateral force components are present the drive motor 21 cannot turn about its transverse axis. At the same time the rubber elements 51,52 protect the window pane and drive motor 21 from damage when the door is slammed.

Also, the construction of a two-stage gearing provides an extremely flat and narrow motor and gear block which can be fixed with keyed engagement in the pane bore 10 at the center of gravity of the system through the fixing eye 26 located on the gearing housing.

FIGS. 5–8 show in plan view, side view, longitudinal cross-section and partial section a drive device which can be connected to a stationary structural element, more particularly to a base plate or an inner door panel or door module for a window regulator drive device. To this end, the gearing housing 20 has a ring collar 61 which, according to FIG. 7, can be snugly inserted into a passage 30 in a base plate or door module 3. A cable drum or pinion for operating the translatory displaceable component part can be fixed on the axis 60 of the gearing housing 20 while the drive is produced through a drive motor 21 and gearing 22 according to FIGS. 5 and 6.

Figure 8:
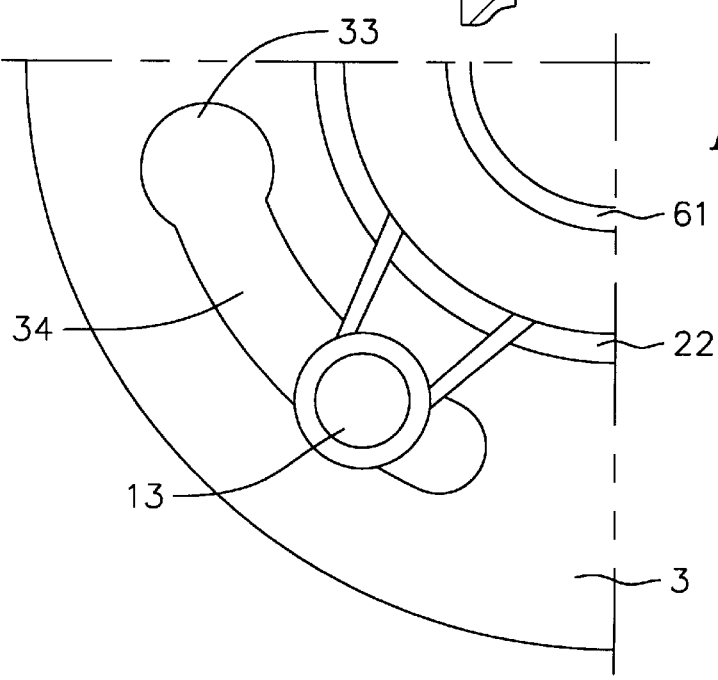
FIG. 8 is a partial view of the fixing device for connecting the drive device with an inner door panel or door module according to FIG. 7.

Cap or ball bolts 13, 14, 15 are mounted further outside the swivel axis 60 of the gearing housing 20 and can be inserted into recesses 33, according to FIG. 8, in the base plate or in the inner door panel or door module 3 for receiving the drive device. The diameter of the recesses 33 corresponds to the diameter of the bolt heads of the cap or ball bolts 13, 14, 15 so that they can be pushed through the base plate, inner door panel or door module 3. As a result of the centering of the gearing housing 20 by means of the ring collar 61, an accurate position fixing is achieved for the drive device comprising drive motor 21 and gearing 22. After this position fixing, the gearing housing 20 is turned into the operating position so that the bolt heads of the cap or ball bolt 13, 14, 15 come to rest on the outer face of the base plate, inner door panel or door module 3 while the bolt pins are pushed through the corresponding recesses 34 (FIG. 8).

The gearing housing 20 furthermore has damping elements 16, 17 which engage with damping elements 18, 19 which can be inserted in the base plate, inner door panel or door module 3. After the drive device has been inserted in the recesses or passages 30, 33, 34 on the base plate, inner door panel or door module 3 and turned into the operating position, the drive device is secured with the damping elements 16, 17, 18, 19 against rotations which do not extend over the prescribed extent of the damping rate. The drive device is thereby turned under load a maximum of ±5° about the swivel axis 60 wherein the pretension of the damping elements 16, 17, 18, 19 and their Shore hardness determine the desired turning angle and thus the damping rate. In this way the drive device can move softly into the stops without the axial distance being altered when using a toothed segment window regulator as the translatory displaceable component part.

The cap or ball bolts 13, 14, 15 are preferably mounted in swages in the inner door panel, the base plate or door module wherein rubber discs 11, 12 for acoustic uncoupling are insertable in the indentations of the swages so that a transfer of drive noises to the relevant stationary structural element is minimized.

Instead of cap or ball bolts, other geometric forms of these fixing elements are also possible wherein preferably the insert face of the fixing element in the stationary structural element is designed as a corresponding counter shape so that an additional reinforcement of the overall arrangement is achieved.

As a result of the arrangement according to the invention, the drive device can easily be fitted or clipped and contacted from inside or outside onto a base plate, inner door panel or door module. Fitting and dismantling is thereby possible in a minimum amount of time. The drive device can be mounted selectively in a dry or wet space.

Plastic parts can be inserted in order to improve the sliding action in the necessary turning angle range . Also, rubber discs are possible with a corresponding Shore hardness for additional noise reduction. The rubber discs or intermediate layers of rubber 11,12 cost-effectively uncouple the drive device from the inner door panel, base plate and door module. The rubber elements 18, 19 which define the turning angle can be pushed or inserted with ease into the damping chambers which are located in the inner door panel area.

I claim:

1. Device for adjusting translatory displaceable component parts in motor vehicles, wherein the translatory displaceable component part has a bore for receiving a connecting part of an entrainment device and fixing or support elements; and
   wherein elastic elements support the translatory displaceable component part on the entrainment device;
   wherein the entrainment device comprises a drive device for adjusting the translatory displaceable component part,
   wherein the drive device is connected by an axis to the translatory displaceable component part and is supported elastically relative to the translatory displaceable component part and is capable of swivel movement about an axial center point, defining therein a swivel axis; and
   wherein the elastic elements, after assembly of the translatory displaceable component part, still retain sufficient deformability so that a predefined damping effect can be achieved through swivel movement about the swivel axis.

2. Device according to claim 1 wherein the translatory displaceable component part comprises several recesses or passages for receiving the axis and fixing elements of the drive device.

3. Device according to claim 2, wherein a gearing housing of the drive device has an axially extending ring collar and several radially spaced fixing and damping elements set outside of the swivel axis of the ring collar and gearing housing.

4. Device according to claim 3 wherein the fixing means and the devices on the translatory displaceable component part for receiving the fixing means are matched geometrically to each other.

5. Device according to claim 4 wherein the fixing elements consist of bolts with cap or ball shaped heads which can be inserted through bores of the translatory displaceable component part adapted to the diameter of the bolt heads and by turning of the drive device can be inserted into radially aligned recesses adapted to the diameter of the bolt pins, and that the drive device can be secured against turning in the operating position by means of the damping elements.

6. Device according to claim 3 wherein the damping elements are pretensioned.

7. Device according to claim 1 wherein the translatory displaceable component part is connected to the drive device through at least one spring-elastic supporting point.

8. Device according to claim 7 wherein a fixing bolt connected or connectable with the drive device is fitted through the bore of the translatory displaceable component part, wherein on either side of the bore are supporting points for mounting the damping elements.

9. Device according to claim 8 wherein the supporting points are provided on a lower edge of a window pane and are mounted with keyed engagement in fixing brackets which are connected to the drive device with elastic shaped elements inserted or injected therein as damping elements.

10. Device according to claim 1 wherein the drive device has a two-stage gear construction.

11. Device according to claim 10 wherein an output of the drive device is designed as a hollow shaft with form-locking elements so that the drive device is connectable on both end sides with a pinion or a cable drum for driving the translatory displaceable component part.

12. A device for adjusting a translatory displaceable component part in a motor vehicle, the translatory displaceable component part having a bore, the device comprising:
   an entrainment device having a drive device for adjusting the translatory displaceable component part and a connecting part for coupling the translatory displaceable component part to the entrainment device at an axial center point, wherein the connecting part adjusts for receipt into the bore of the translatory displaceable component part;
   elastic elements supporting the translatory displaceable component part on the entrainment device,
   wherein the drive device is adapted for swivel movement about the axial center point, thereby defining a swivel axis; and
   wherein the elastic elements, after assembly of the translatory displaceable component part with the entrainment device, still retain sufficient deformability so that a predefined damping effect can be achieved through swivel movement about the swivel axis.

13. The device in claim 12 further comprising a translatory displaceable component part,
   wherein the drive device comprises an axis and fixing elements; and
   wherein the translatory displaceable component part has several recesses or passages for receiving the axis and fixing elements of the drive device.

14. Device according to claim 13, wherein the drive device further comprises a gearing housing, the gearing housing comprising:
   a swivel axis;
   an axially extending ring collar, wherein the ring collar comprises a swivel axis; and
   fixing and damping elements, wherein the fixing and damping elements are radially spaced and set outside of the swivel axis of the ring collar and gearing housing.

15. Device according to claim 14 wherein the fixing elements of the gearing housing and the recesses or passages of the translatory displaceable component part for receiving the fixing elements are matched geometrically to each other.

16. Device according to claim 15, wherein the recesses of the translatory displaceable component part comprise a diameter, and wherein the fixing elements comprise:
   bolts with cap shaped or ball shaped heads, wherein the cap or ball shaped heads have a diameter;
   wherein the recesses of the translatory displaceable component part are radially aligned;
   wherein the diameter of the recesses corresponds to the diameter of the cap or ball shaped heads;
   wherein the cap shaped or ball shaped heads can be inserted into the radially aligned recesses by the turning of the drive device; and
   wherein the drive device can be secured against turning in the operating position by means of the damping elements.

17. Device according to claim 14, wherein the damping elements are pretensioned.

18. Device according to claim 12 wherein the entrainment device further comprises damping devices positioned on either side of the bore, each damping device comprising:
   fixing brackets; and
   rubber form elements, the rubber form elements being inserted into the fixing brackets;
   wherein at least one damping device connects the translatory displaceable component part and the drive device;
   wherein the damping devices are provided on the lower edge of a window pane and are mounted with keyed engagement into the fixing brackets which are connected to the drive device with the rubber form elements.

19. Device according to claim 18 wherein the connecting part comprises a fixing bolt, the fixing bolt connected to or connectable with the drive device and fitted through the bore of the translatory displaceable component part.

20. Device according to claim 12 wherein the drive device further comprises:
   a drive motor;
   a drive worm with pinion;
   a gearing which has the drive worm connected to the motor shaft;
   a worm wheel; and
   two stepped gear wheels for a two-step gearing, wherein the two-step gearing consists of the worm wheel meshing with the drive worm with pinion and gearwheel.

21. Device according to claim 20, wherein the output of the drive device is designed as a hollow shaft with form-locking elements so that the drive device is connectable on both end sides with the pinion or a cable drum for driving the translatory displaceable component part.

* * * * *